(12) United States Patent
Courtay

(10) Patent No.: US 7,299,164 B2
(45) Date of Patent: Nov. 20, 2007

(54) MIXED-SIGNAL FINITE STATE MACHINE MODELS ENSURING ANALOG CONTINUITY

(75) Inventor: Alan Courtay, Tigard, OR (US)

(73) Assignee: Synopsys, Inc., Mountain View, CA (US)

( * ) Notice: Subject to any disclaimer, the term of this patent is extended or adjusted under 35 U.S.C. 154(b) by 668 days.

(21) Appl. No.: 10/683,925

(22) Filed: Oct. 10, 2003

(65) Prior Publication Data

US 2005/0080600 A1    Apr. 14, 2005

(51) Int. Cl.
*G06F 17/10*    (2006.01)
(52) U.S. Cl. ............................................ 703/2; 703/13
(58) Field of Classification Search .................... 703/2, 703/13
See application file for complete search history.

(56) References Cited

U.S. PATENT DOCUMENTS

2002/0167544 A1* 11/2002 Raghavan et al. .......... 345/763

OTHER PUBLICATIONS

Panos J. Antsaklis, "Special Issue on Hybrid Systems: Theory and Application A Brief Introduction to the Theory and Applications of Hybrid Systems", Jul. 200, Proceedings of the IEEE, vol. 88, No. 7, pp. 879-887.*

Ernst Christen et al.; "VHDL-AMS—A Hardware Description Language for Analog and Mixed-Signal Applications", Oct. 1999, IEEE Transactions on Circuits and Systems-II: Analog and Digital Signal Processing, vol. 46, No. 10, pp. 1263-1272.*
Tom J. Kazmierski; "Fuzzy-logic digita-analogue interfaces for accurate mixed-signal simulation", 1998, Proceedings of the conference on Design, automation and test in Europe, pp. 941-944.*

* cited by examiner

*Primary Examiner*—Paul Rodriguez
*Assistant Examiner*—Russ Guill
(74) *Attorney, Agent, or Firm*—Bever, Hoffman & Harms, LLP; Jeanette S. Harms

(57) ABSTRACT

A modeling technique that extends the formalism of finite state machines to analog and mixed-signal systems is proposed. The intended use of this technique is to generate continuous mixed-signal models from a state diagram description. Analog equations can be associated with the states of a finite state machine. A state vector ensures analog continuity between state equations during transitions. Specifically, the state vector components are weight coefficients that vary continuously between 0 and 1, thereby allowing the different state equations of an analog variable to be enabled or disabled depending on which state is active. The state vector formalism supports concurrency (i.e. several states being active at the same time) as well as interrupted transitions (i.e. transitions occurring before the transition time of a previous transition has elapsed). The profile and duration of a transition can be set, thereby allowing a user to accurately match the real behavior of a system as well as aid the simulator to converge.

10 Claims, 9 Drawing Sheets

401

| variable<br>state | $x_1$ | $x_2$ | $x_3$ | $x_4$ |
|---|---|---|---|---|
| S1 | ✕ | ✕ | | |
| S2 | ✕ | | | |
| S3 | | ✕ | | |
| S4 | | | ✕ | ✕ |
| S5 | | | ✕ | ✕ |

402

| variable combination | $x_1$ | $x_2$ | $x_3$ | $x_4$ |
|---|---|---|---|---|
| 1 | S1 | S1 | S4 | S4 |
| 2 | S1 | S3 | S4 | S4 |
| 3 | S2 | S1 | S4 | S4 |
| 4 | S2 | S3 | S4 | S4 |
| 5 | S1 | S1 | S5 | S5 |
| 6 | S1 | S3 | S5 | S5 |
| 7 | S2 | S1 | S5 | S5 |
| 8 | S2 | S3 | S5 | S5 |

MIXED-SIGNAL FINITE STATE MACHINE MODELS ENSURING ANALOG CONTINUITY

BACKGROUND OF THE INVENTION

1. Field of the Invention

The present invention relates to the generation of mixed-signal finite state machine models ensuring analog continuity.

2. Discussion of the Related Art

Simulation allows engineers to determine whether a design functions properly in a software environment before implementing it in silicon, real hardware, or embedded software. Specifically, simulation is used to predict the behavior of a system by relying on the mathematical models of the system components. Three levels of models are typically distinguished in system simulation: digital, analog, and mixed-signal.

A digital or event-driven model of a system describes the system with signal assignments, also called events. An event is scheduled and executed in response to changes of values of signals and uses the present values of signals it reads to determine new values for other signals. The signals are discontinuous variables, i.e. their change occurs at discrete time points. The connectivity between the different digital models in a design defines the signal flow. Due to their high simulation speed, digital models are usually preferred to simulate algorithms or electronic circuitries at a high level of abstraction (behavioral).

Analog models are used whenever the need arises to characterize detailed physical effects like energy transfers in an electrical network. Just like the effects they represent, analog models are continuous. They are composed of sets of simultaneous equations. These equations are differential and algebraic equations with sets of unknowns that are continuous functions of time. These unknowns are the analog variables of the system. While digital simulators primarily handle an event queue, analog solvers deal with a system of non-linear differential equations. In a transient analysis, most analog solvers choose the time points at which the system is solved in order to meet their accuracy criteria. Because of the highly iterative numerical techniques involved (numerical integration, non-linear solution algorithm and matrix inversion), analog simulation is computationally expensive, especially for large designs.

Mixed-signal models include both analog and digital components, and often focus on the interface between analog and digital systems. Such models allow portions of a digital system to be analyzed in more detail by using analog equations without the burden of simulating a fully analog design. Mixed-signal models are also needed when a system is explicitly mixed-signal with separate digital and analog parts. For example, a power converter includes analog switches and digital control circuitry working concurrently. Hardware description languages such as MAST, VHDL-AMS or Verilog-AMS, offer mixed-signal capabilities. However the exchange of data between the digital simulation kernel and the analog solver has to be implemented carefully by the author of the model in order to get accurate results and avoid convergence problems. The analog-to-digital conversion involves triggering events when analog conditions are met. The timing of the events often needs to rely on threshold detections. The digital-to-analog conversion involves creating continuous profiles using ramp or slew functions in order to avoid discontinuity in the analog equations. Mixed-signal modeling languages provide functions to implement these conversions, but this task remains non-trivial for most end-users and is still a barrier to potential increases in design productivity.

A popular way of representing a digital or event-driven system is through a state diagram description. State diagrams are a powerful visual formalism for capturing complex system behavior at a high level of abstraction. The models derived from a state diagram description are called finite state machine models. A finite state machine model represents a system that progresses through a series of states by responding to a set of transition conditions. The model stores all of the system's possible states, as well as each state's conditions to transition to another state. State charts have been widely used to describe digital or event-driven systems. The state transitions define the conditions upon which events are triggered. The actions performed during a transition (transition action, state entry or state exit action) are merely event-driven variable assignments assumed to take an insignificant amount of time. Most digital state machine modeling tools also support concurrency: more than one state can be active at the same time. This feature allows a user to easily model parallel activities in a system. States that are related directly or indirectly through transitions cannot be active at the same time. They are exclusive and belong to the same concurrent group of states. In a system, there are always as many concurrent groups as active states.

Several attempts to extend the state machine formalism to analog mixed-signal models have been proposed. Simplorer™, licensed by Ansoft Corporation, and Dymola™, licensed by Dynasim, are examples of commercial simulators allowing the user to create mixed-signal state machine models. In the case of Simplorer™, the state machines are digital but their time-discrete output can be directly used in the analog equations of the model. However the user is left with the task of inserting ramp functions outside the state machine to address discontinuities. This task requires significant modeling and computer language expertise. In the case of Dymola, analog equations defining analog variables can be directly associated with the states. But there is no provision to avoid discontinuity in the generated models.

The problem of discontinuity with respect to implementing a mixed-signal finite state machine model is further described in reference to FIGS. 1A and 1B. For example, consider a digitally controlled analog switch model (hereinafter switch model) 100 shown in FIG. 1A. Switch model 100 has two electrical terminals p and m, and a digital control pin c. As shown in FIG. 1B, switch model 100 comprises three states: "on", "off" and "burnt". The conditions that affect those states are the value of the input pin c (0 or 1) and the power dissipated by the switch (given by Ohm's law as the product of the voltage v by the current i). Setting the control pin to 0 results in the switch turning off, and setting the control pin to 1 results in the switch turning on. If the power dissipated in the switch exceeds a predetermined value pmax, then the switch moves into the "burnt" state.

In a mixed-signal finite state machine model (hereinafter model), the analog variables are defined through distinct equations depending on which state is active. For example in switch model 100, the current is defined as follows:

$$\text{State ``off''}: \quad i = \frac{v}{roff} \qquad (1)$$

$$\text{State ``on''}: \quad i = \frac{v}{ron}$$

$$\text{State ``burnt''}: \quad i = 0$$

In state "off", switch model 100 provides a high resistance roff to current flowing between the p and m terminals. In state "on", it provides a minimal resistance ron. In state "burnt", switch model 100 allows no current to flow between the p and m terminals.

When a transition occurs in switch model 100, the simulator has to cope with stiff change in the model equations. If no precautions are taken during the model elaboration, the discontinuity in the analog equations is likely to result in simulation convergence problems. Specifically, it can cause spikes (e.g. unreal abrupt changes in voltage or current), higher sensitivity to simulation parameters (e.g. truncation error, time step, etc.), excessive CPU times, and/or aborted simulations. Because the switch is likely to be placed in a design that includes many other models, identifying the origin of the simulation problems and then resolving them can be highly time consuming.

Therefore, a need arises for a method of automatically implementing analog continuity in mixed-signal finite state machine models. This method must still allow the user to define concurrent states. Indeed, concurrency is an important feature of an event-driven state machine that must be preserved.

SUMMARY OF THE INVENTION

In accordance with one feature of the invention, analog equations can be associated with the states of a finite state machine. A mathematical formalism allows the generated models to ensure analog continuity during transitions. This formalism is based on the definition of state vectors. The components of a state vector are weight coefficients varying continuously between 0 and 1, thereby allowing the different state equations of an analog variable to be enabled or disabled depending on the active state.

Consider the case of one state-dependent analog variable x in a system containing N states. It is first assumed that each state $S_j$ carries a distinct governing equation or definition for x: $Eq_j=0$ with $1<=j<=N$ (in its most general form, the equations are non-linear and differential). The following composite equation is then implemented in the model:

$$\sum_{j=1}^{N} s_j \cdot Eq_j = 0 \qquad (2)$$

where $(s_j)$ is the state vector enabling the equation of the active state while disabling the others. To avoid discontinuity during a state transition, the $s_j$ coefficients act as ramp functions varying between 0 and 1. The user can set their profile to be linear or cubic as well as their duration. The objective of this calibration is to match the behavior of the device and/or aid the simulator to converge. Long transition times with a cubic profile typically create less abrupt changes and tend to facilitate convergence.

Another aspect of the invention is to allow a transition to occur before the transition time of a previous transition has elapsed, and still guarantee analog continuity. In this case, the previous transition is interrupted while the system is redirected towards a third state. Since the state vector allows several state equations to contribute to the system behavior at the same time, it can be viewed as a multi-dimensional ramp.

States with no equations can also be permitted. When visiting such states, the state vector remains unchanged and the enabled equation of an analog variable is the one of a previously visited state. This feature provides significant flexibility when defining the state chart. It is also required to support concurrency (i.e. more than one state being active at the same time). When analog variables are defined through equations in the same states, they share the same state vector. If this is not the case, the model includes more than one state vector.

In summary, the model generation software uses the state vector formalism to automatically implement multi-dimensional ramp functions in mixed-signal state machine models and consequently increase their robustness.

BRIEF DESCRIPTION OF THE FIGURES

FIG. 4C lists the combinations of equations possibly enabled at the same time in the system described in FIGS. 4A and 4B.

DETAILED DESCRIPTION OF THE PREFERRED EMBODIMENT

A mixed-signal finite state machine model attempts to reproduce or predict the behavior of an analog mixed-signal system including several modes of operation. The modes of operation are represented by states. A state is a Boolean variable that is either active or inactive. Activity in a finite state machine is determined by state transitions. A state transition is defined by a pair of states (an origin and a destination state) and a Boolean expression (the transition condition). When the origin state is active and the transition condition becomes true, the destination state then becomes active and the origin state inactive.

The state-dependent analog variables characterizing the analog mixed-signal system (such as electrical voltages or currents) are defined through different analog equations depending on which state is active. Analog equations are associated with states in such a way that, when a state is active, its associated equations are enabled and define the values of the analog variables. However, instantly enabling and disabling analog equations during a state transition introduces discontinuities likely to cause convergence difficulties in most simulators. The discussion that follows shows how this problem can be addressed.

Figure 1A:
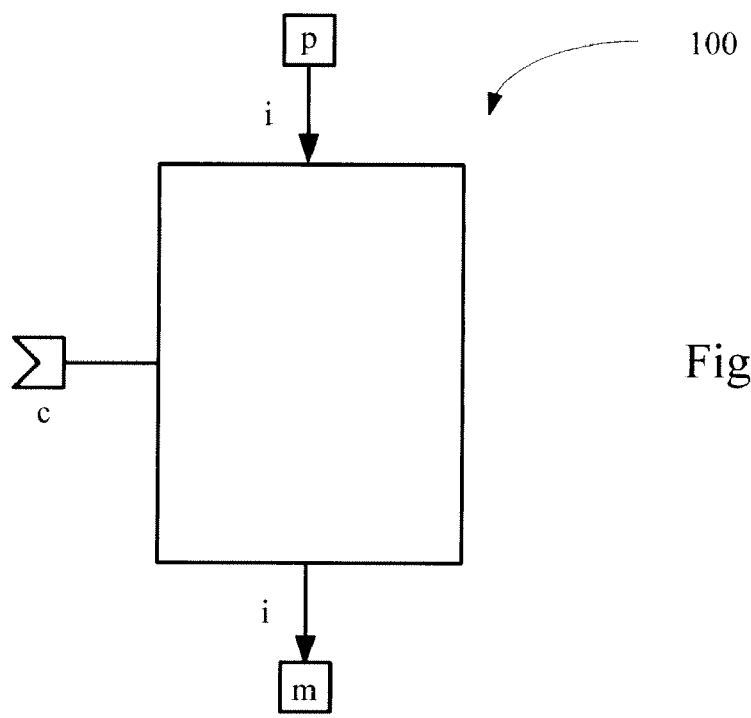
FIG. 1A illustrates a standard topology for a digitally controlled analog switch model.
Figure 1B:
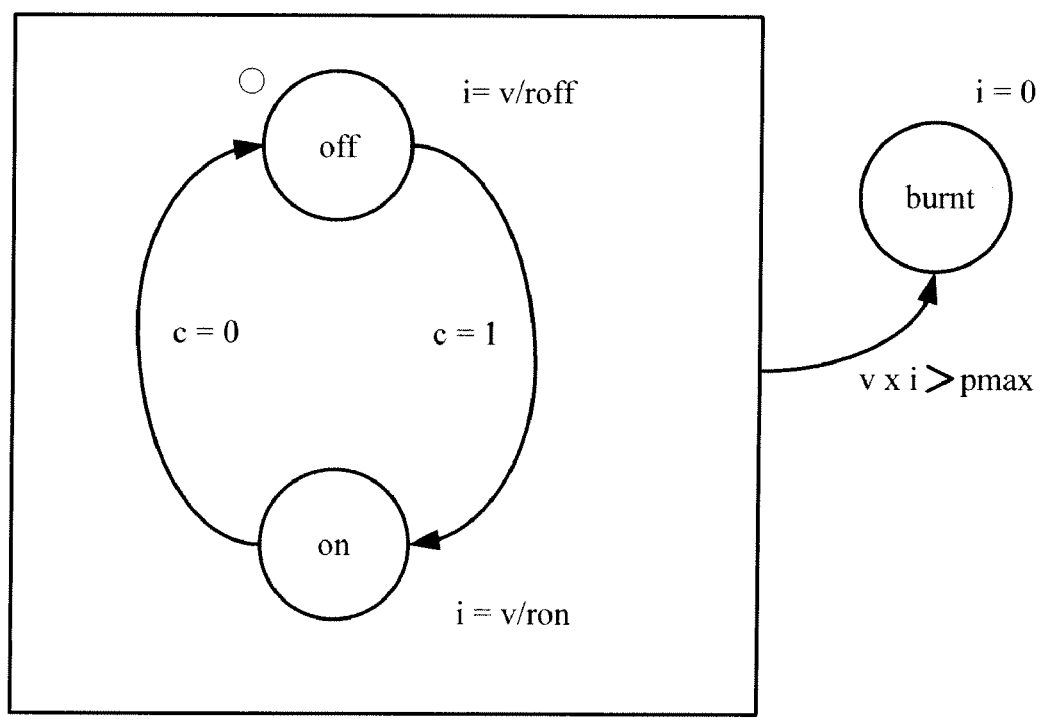
FIG. 1B shows the states of the switch model of FIG. 1A. The dot close to the state "off" indicates that this state is the initial one.

A digitally controlled analog switch model (see switch model 100 in FIGS. 1A and 1B) is an example of a mixed-signal finite state machine model. In switch model 100, the only state-dependent analog variable is the current flowing between terminals p and m. Each state carries a distinct governing equation for the current (see equations (1)). A composite equation for the current is formed as follows:

$$i = s_1 \cdot \frac{v}{roff} + s_2 \cdot \frac{v}{ron} + s_3 \cdot 0 \qquad (3)$$

where $(s_1, s_2, s_3)$ is the state vector of the variable i. Note that the composite equation (3) is in an explicit form. This is possible when the user expresses all the state equations in an explicit form. If one equation is implicit, then the composite equation will also be implicit. In one embodiment, the explicit form can be used, thereby requiring less computation by the simulator and being less likely to create convergence difficulties. The software writing the model in the hardware description language (e.g. MAST, VHDL-AMS, or Verilog-AMS) should be able to recognize the form of the equations given by the user to cast the composite equation in the appropriate form. Symbolic simplifications of the composite equation can also be performed at this point. For example, after symbolic simplifications, the composite equation (3) can be implemented in the model as follows:

$$i = v \cdot \left( \frac{s_1}{roff} + \frac{s_2}{ron} \right) \qquad (4)$$

In general, let $(x_i)$ be a vector of M state-dependent analog variables in a system with N states. It is first assumed that the system does not have concurrent states and that each state $S_j$ contains a distinct governing or constraint equation for all variables $x_i$:

$$Eq_{i,j}(x_1, x_2, \ldots, x_M) = 0 \text{ with } 1 \leq i \leq M \text{ and } 1 \leq j \leq N \qquad (5)$$

Note that the case of concurrent states and the case where not all states carry an equation for the variables $(x_i)$ are discussed later. In their most general form, equations (5) are non-linear and differential. Note also that the constraint equation of a variable $x_i$ can involve the other variables $x_1$ to $x_M$ as well as input stimulus variables and the time variable. However, for the sake of readability, equations (5) are written as $Eq_{i,j}=0$.

To ensure continuity during state transitions, the following system of equations is implemented in the model:

$$\left( \sum_{j=1}^{N} s_j \cdot Eq_{i,j} = 0 \right)_{1 \leq i \leq M} \qquad (6)$$

where $(s_j)$ is the state vector used in the composite equations defining the variables $x_i$. The $s_j$ coefficients vary continuously between 0 and 1 in order to enable the equations of the active state while disabling the others.

When the condition of a transition from a currently active state $S_b$ to a destination state $S_e$ is met, the simulation time and the state vector $(s_j)$ at the beginning of the transition are respectively recorded in a discrete-in-time variable $t_b$ and a discrete-in-time vector $(sb_j)$ (in these notations, the letter "b" stands for "begin" and the letter "e" for "end"). The state vector corresponding to the destination state $S_e$ is also recorded in a discrete-in-time vector $(se_j)$ as follows:

$$\text{if } j=e, \, se_j=1 \text{ else } se_j=0 \qquad (7)$$

Figure 2A:
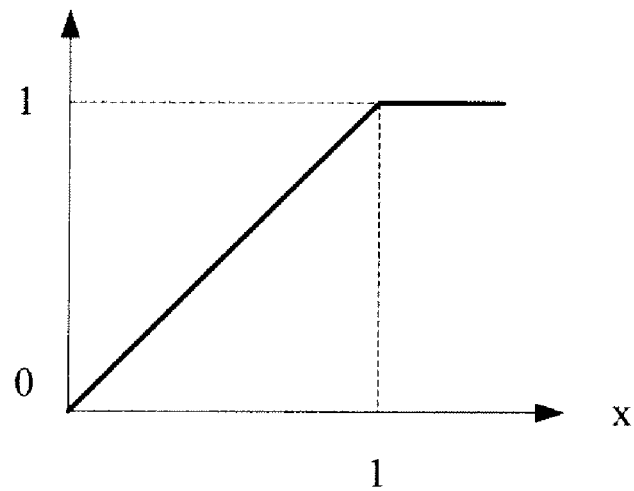
FIG. 2A illustrates the linear profile of a ramp function applied to an analog variable during a state transition.

From time $t_b$ on, the state vector $(s_j)$ is computed as follows:

$$s_j = sb_j \cdot \left(1 - F\left(\frac{t-t_b}{tt}\right)\right) + se_j \cdot F\left(\frac{t-t_b}{tt}\right) \qquad (8)$$

where
t is the current simulation time
tt is the transition time from state $S_b$ to state $S_e$
F is a ramp function (linear or cubic).
The linear ramp function, shown in FIG. 2A, is defined as follows:

$$F(x) = \begin{cases} 0 & \text{if } x \leq 0 \\ x & \text{if } 0 < x \leq 1 \\ 1 & \text{if } x > 1 \end{cases} \qquad (9)$$

Figure 2B:
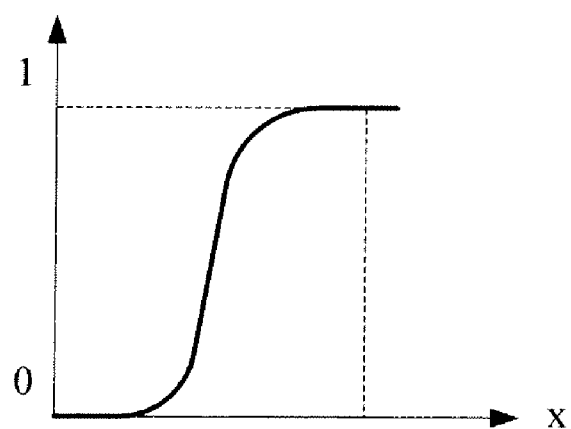
FIG. 2B illustrates the cubic profile of a ramp function applied to an analog variable during a state transition.

The cubic ramp function, shown in FIG. 2B, is defined as follows:

$$F(x) = \begin{cases} 0 & \text{if } x \leq 0 \\ -2x^3 + 3x^2 & \text{if } 0 < x \leq 1 \\ 1 & \text{if } x > 1 \end{cases} \qquad (10)$$

As shown in FIG. 2B, the cubic profile provides continuity in the first derivative with respect to time. Continuity in the slope sometimes helps the simulator to converge by reducing the stiffness of the change in the governing equations of the state-dependent analog variables. In one embodiment, the user can choose the profile (i.e. linear or cubic) as well as the transition time.

Figure 3A:
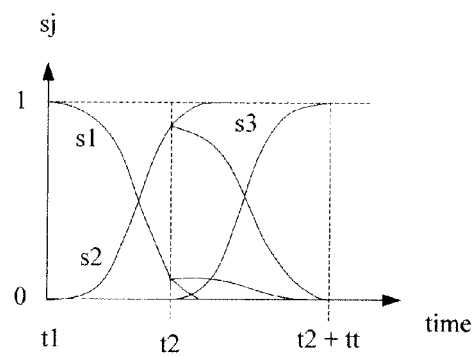
FIG. 3A shows the state vector of the switch model of FIG. 1B as function of time during an interrupted transition, i.e. a transition within a transition.
Figure 3B:
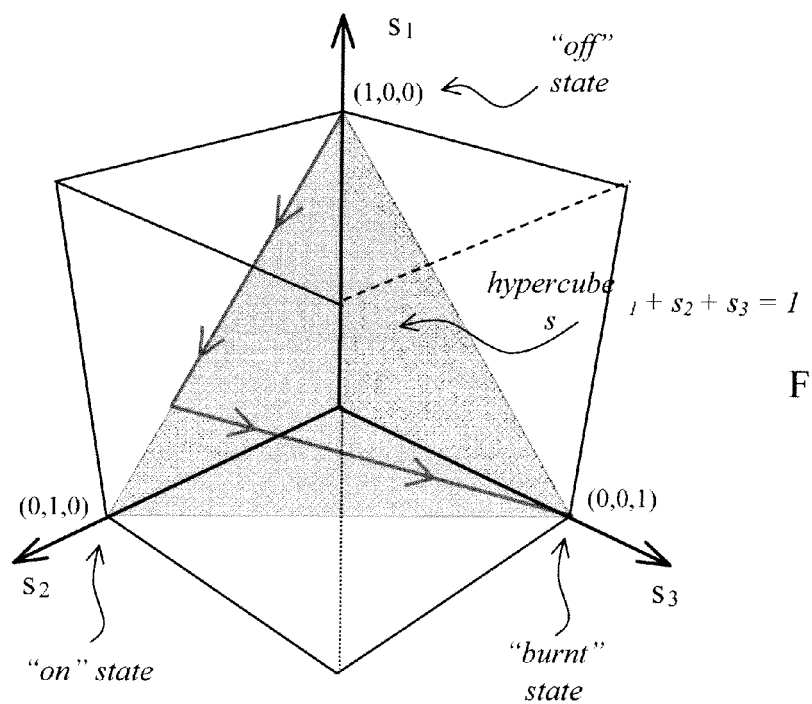
FIG. 3B shows the trajectory of the state vector corresponding to the transition sequence shown in FIG. 3A.

One important aspect of equation (8) is that it can handle a transition occurring before the transition time of a previous transition has elapsed. This situation is illustrated in FIGS. 3A and 3B using switch model 100. At time $t_1$, the initial state "off" is active and the digital control pin is set to 1. The condition for the transition from "off" to "on" being met, the state vector $(s_j)$ moves from (1,0,0) to (0,1,0) according to equation (8). The weight $s_1$ of the "off" state begins decreasing to zero while the weight $s_2$ of the "on" state begins increasing to one (the weight $s_3$ of the "burnt" state remains equal to zero). During this transition, the external circuit where the model is placed forces current to flow through the closing switch. As a result, the power dissipated in the switch increases until it reaches the value of the maximum power "pmax" at time $t_2$. Even though the state vector has not reached its destination point of coordinates (0,1,0) yet, the active state of the model has been "on" since time $t_1$ (indeed the analog equations always lag behind the active state). When the condition of the transition from "on" to "burnt" is met at time $t_2$, the active state becomes "burnt". The first transition is then interrupted and the state vector ($s_i$) is redirected towards (0,0,1) which is eventually reached at time $t_2$+tt. In this example, the profile of the ramp function is cubic (as seen in FIG. 3A). However, note that the trajectory of the state vector in the state diagram of FIG. 3B would be depicted identically for the transitions having a linear profile.

During this transition sequence, continuity in the value is guaranteed but not continuity in the slope (despite the cubic profile). Continuity in the slope is only achieved if no transition occurs within a transition. However, in most cases, continuity in the value is sufficient to ensure convergence.

The state vector values are not discrete, but rather form a continuum of intermediate states. By induction, it is easily proven from equation (8) that, at all times, the equality below is verified:

$$\sum_{j=1}^{N} s_j = 1 \quad (11)$$

Equation (11) is the equation of a hypercube (i.e. a linear space of reduced dimension (N−1)) containing the points of coordinates ((1,0, . . . ,0), (0,1,0, . . . ,0), (0,0,1, . . . ,0), (0,0,0, . . . ,1)). The domain where the state vector takes its values is therefore included in the hypercube defined by equation (11). In the case of switch model 100, the state vector domain is included in the plane containing the 3 points of coordinates (1,0,0), (0,1,0) and (0,0,1). Note that the region allowed inside the hypercube is restricted by the following boundary conditions:

$$\forall j,\ 0 \leq s_j \leq 1 \quad (12)$$

So far, it has been assumed that all states carry an equation for the variables ($x_i$). However the state vector formalism can still apply to relaxed systems where this assumption is not verified. When a state with no equation for an analog variable $x_i$ becomes active, $x_i$ simply keeps its governing equation from a previously visited state. To ensure that such an equation exists, the initial state (or states) must carry an equation for all the state-dependent analog variables in the system.

Relaxed equation definition is required to support concurrency. It also brings flexibility when describing systems with more than one state-dependent analog variable. Indeed, more combinations of enabled analog equations are obtained for a given number of states when some states do not carry an equation for all variables. For example, consider a system 401 and a table 402 that describes system 401 shown in FIGS. 4A and 4B, respectively. System 401 is described by 5 states (S1-S5) and 4 analog variables ($x_1$-$x_4$). A crossed cell in table 402 indicates that an equation exists for the variable of corresponding column in the state of corresponding row. At any time, the behavior of the system is determined by the combination of currently enabled analog equations.

Figures 4A, 4B:
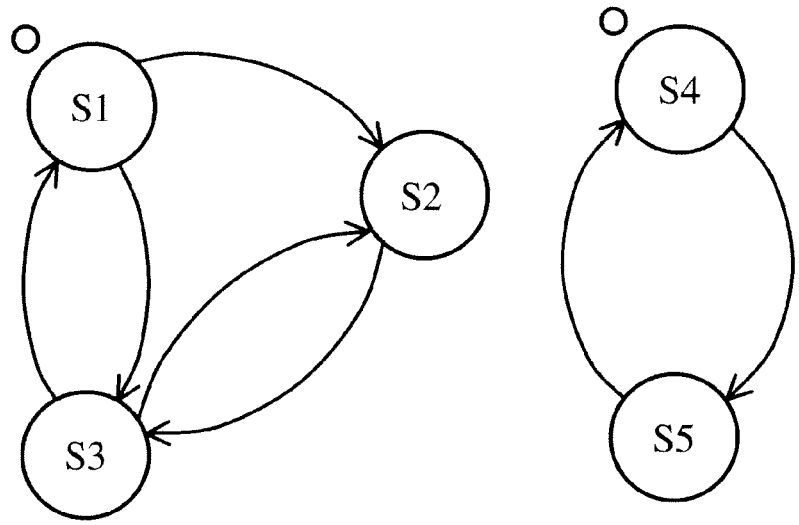
FIG. 4A shows a state machine model with concurrent states.
FIG. 4B shows the distribution of equations for the analog variables $x_1$, $x_2$, $x_3$ and $x_4$ in the states of FIG. 4A. A cross in a table cell indicates that an equation exists for the variable of corresponding column in the state of corresponding row.

In the example depicted in FIGS. 4A and 4B, there are 8 possible combinations of analog equations. The combinations are listed in table 403 shown in FIG. 4C. Each cell in the table shows, for the combination of corresponding row, the state associated with the enabled equation of the variable of corresponding column. For example, the row number 1 corresponds to a combination where the following equations are enabled: equation of $x_1$ associated with state S1, equation of $x_2$ associated with state S1, equation of $x_3$ associated with state S4 and equation of $x_4$ associated with state S4. This combination is simply realized when states S1 and S4 are active (see table 402). The combination of row number 2 is more interesting. It is realized after a transition from S1 to S3 with S4 active. In this situation, because the variable $x_1$ does not have an equation in state S3 (see table 402), the equation governing $x_1$ is the one of the previously visited state S1.

Therefore, with only 5 states in the state diagram, a system with up to 8 modes of operation can be modeled (whether all combinations can actually be reached depends on the transitions defined between the states). This economy of states makes the diagram more parsimonious and easier to implement or read.

The cells in table 402 not having a cross are indicative of relaxed equation definitions, i.e. allow more combinations of equations than the number of states in the diagram. Relaxed equation definitions also allow a system with memory to be more easily modeled. Indeed the analog variables in a state left without equations are determined by previously visited states.

One state vector ($s_j$) is generally not sufficient to model a relaxed system. The concept of equation base is introduced in order to determine the minimum number of state vectors required. The equation base $B_i$ of a variable $x_i$ is the set of states carrying an equation for $x_i$. By definition, the active state of an equation base is the last state visited in the base. Note that this is not necessarily an active state of the system.

Analog variables with the same equation base can share a common state vector. In other words, there are as many state vectors as distinct equation bases in the system. For example, system 401 requires 3 state vectors, one for $x_1$, one for $x_2$, and one for the pair $\{x_3, x_4\}$. The size of a state vector is the number of states in its base. The system of equations to implement in a relaxed equation state machine model becomes:

$$\left(\sum_{j \in B_i} s_j \cdot Eq_{i,j} = 0\right)_{1 \leq i \leq M} \quad (13)$$

At all times, the model must keep track of the active state in each base. A state vector is only altered when a transition occurs leading to a state in the associated base that is not the currently active state of the base. If a transition leads to a state without equations, the state is not in the base. Therefore the state vector remains unaffected.

Note that relaxed equation definitions and concurrency are distinct properties. Concurrency can be analyzed by simply looking at the transitions. Considering the system described in FIG. 4A, there is no transition path, direct or indirect, linking the group of states formed by S1, S2 and S3 to the group formed by S4 and S5. Therefore these two groups are concurrent and each one has an active state. If concurrency is not determined by the association of governing equations with the states, it however imposes some restriction on this association. Indeed an analog variable cannot be defined through governing equations associated with concurrent states. Failing to observe this rule results in a conflict where two active states try to concurrently enable distinct equations for an analog variable. For example, such a conflict would have occurred if the table 402 had contained a cross in the cell (S1, $x_3$).

Figure 5:
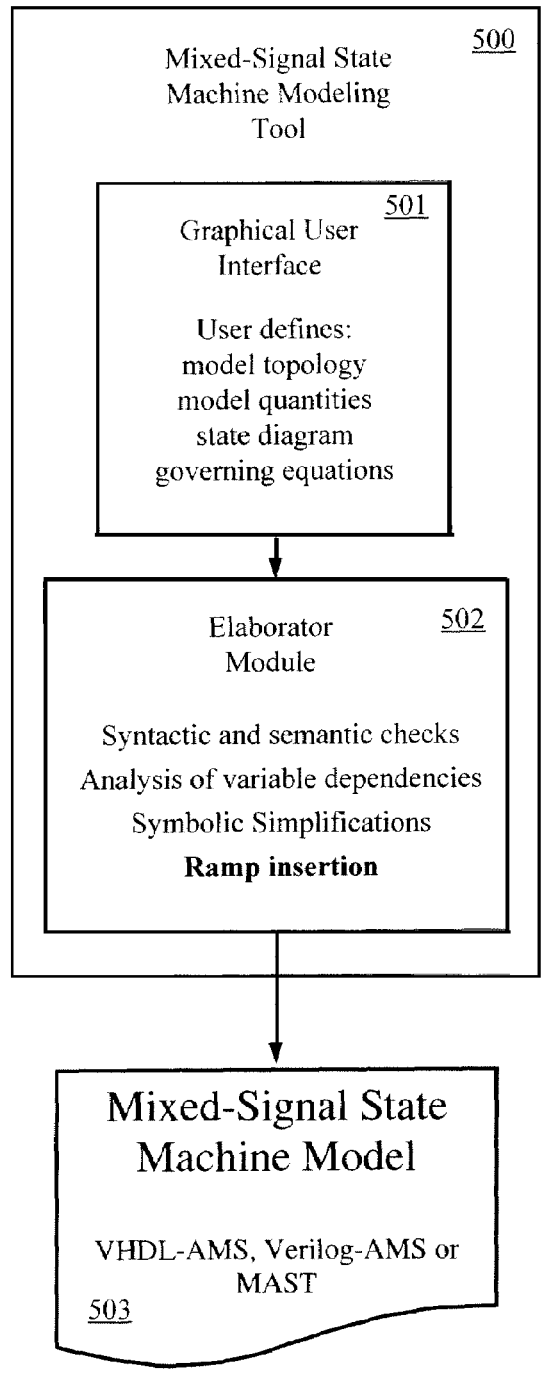
FIG. 5 illustrates the functional flow of a mixed-signal state machine modeling tool.

In accordance with one aspect of the invention, the multi-dimensional ramp technique can be automated and programmed in a modeling tool. FIG. 5 illustrates the functional flow of an exemplary mixed-signal finite state machine modeling tool 500. Through a graphical user interface 501, the user can specify the following model information: terminals, variables (static, continuous and event-driven variables), state diagram structural elements (states, transitions, blocks, etc.), and governing equations for the analog variables in the different states. An elaborator module 502 can process this information to provide syntactic/semantic checks, analyze variable dependencies, generate symbolic simplifications, and, of importance, automatically insert ramps in the models. At this point, a mixed-signal machine model 503 can be generated in a mixed-signal hardware description language.

Figure 6A:
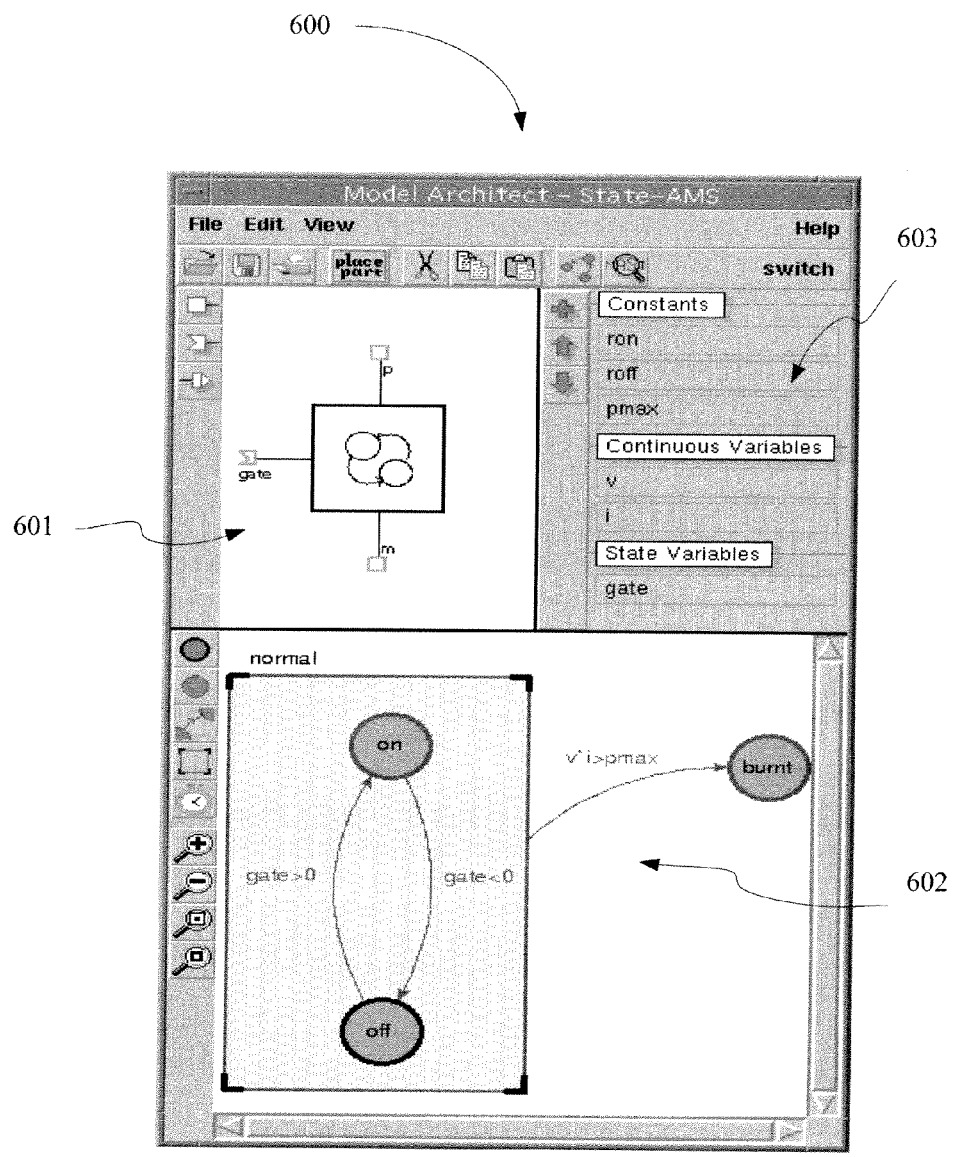
FIGS. 6A, 6B and 6C illustrate screen shots from a modeling tool inserting multi-dimensional ramp functions in mixed-signal finite state machine models.
Figure 6B:
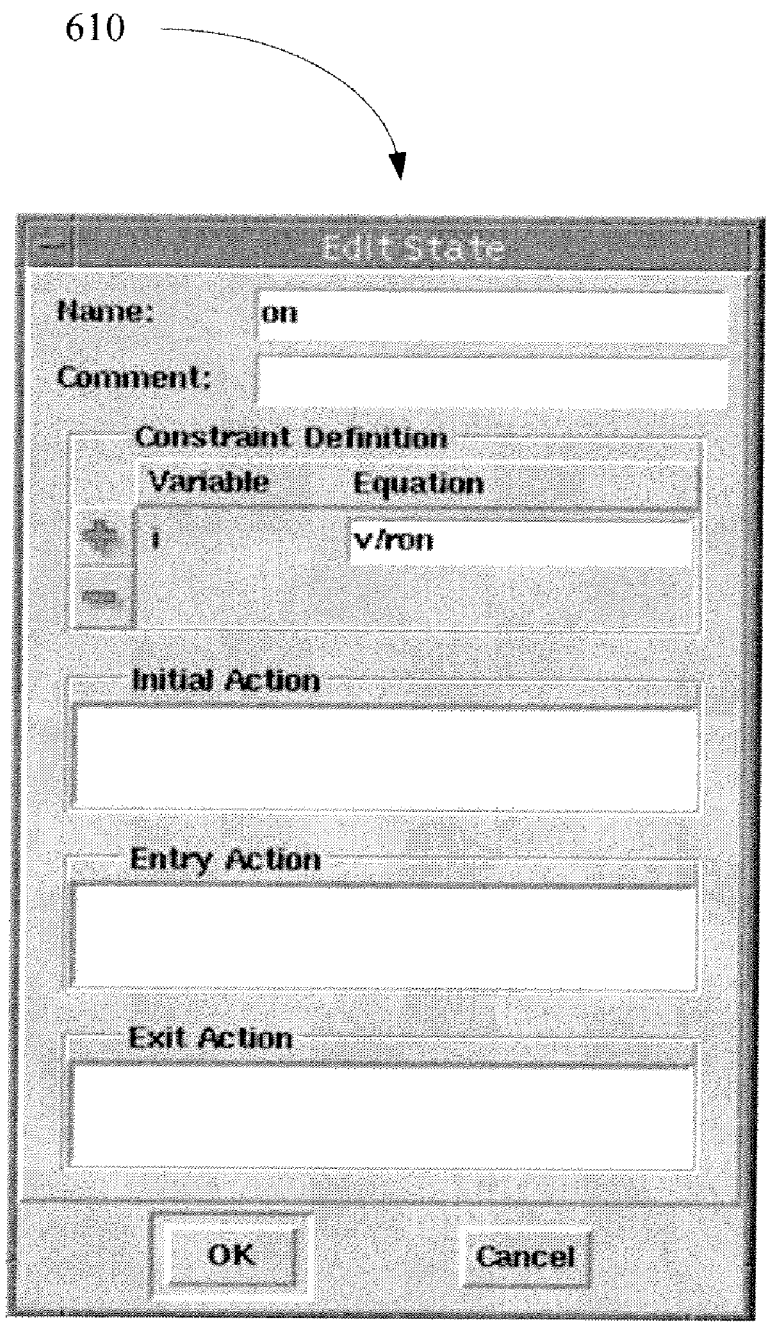
Figure 6C:
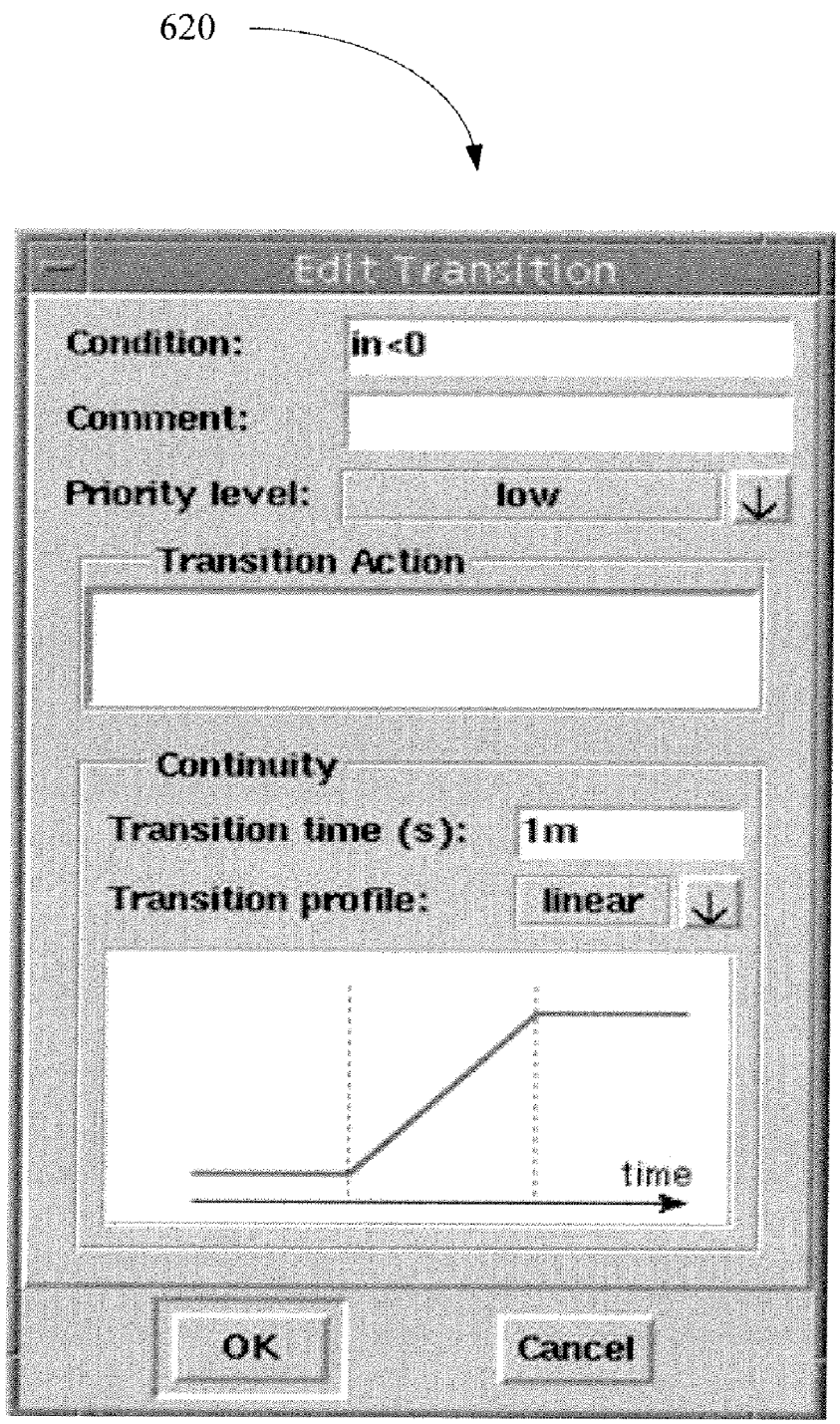

FIG. 6A illustrates an exemplary screen shot 600 from a modeling tool Model Architect StateAMS™, licensed by Synopsys, Inc., that provides a graphical interface for a user to define information regarding a mixed-signal state machine model. Specifically, screen shot 600 includes a field 601 that allows a user to edit the topology of the model, a field 602 that allows a user to edit the states of the model and the conditions triggering such states, and a field 603 that allows a user to define the model quantities or variables. FIG. 6B illustrates a screen shot 610 that allows a user to edit the state-dependent variables. FIG. 6C illustrates a screen shot 620 from StateAMS™ tool that allows a user to edit the information associated with a transition (condition, profile, time, etc.).

A modeling tool automatically including the above-described ramp functions can be incorporated into many simulators, such as the Saber® mixed-signal simulator and the H-SPICE® analog simulator (both licensed by Synopsys, Inc.). Such a modeling tool can use various languages, including but not limited to the MAST Hardware Description Language (HDL)(an industry standard language developed by Synopsys, Inc. that can be used for analog, mixed-signal, and mixed-technology applications), VHDL-AMS (described in IEEE Standard 1076.1, which was approved in 1999), or Verilog-AMS (developed by Acellera in 1998).

Although illustrative embodiments of the invention have been described in detail herein with reference to the figures (with respect to the analog switch model example), it is to be understood that the invention is not limited to those precise embodiments. They are not intended to be exhaustive or to limit the invention to the precise forms disclosed. As such, many modifications and variations will be apparent.

Accordingly, it is intended that the scope of the invention be defined by the following claims and their equivalents.

The invention claimed is:

1. A method of generating a mixed-signal finite state machine model of a system from a state diagram, method including:
    allowing a user to define an analog variable through a set of state equations corresponding to different states in the state diagram;
    forming a composite equation for the analog variable constructed as a weighted sum of the set of state equations;
    using a set of ramp functions as weights in the composite equation varying continuously between 0 and 1 to further define the analog variable, the set of ramp functions forming a state vector and ensuring continuity of the analog variable during a state transition;
    generating the mixed-signal finite state machine model by using the defined analog variable; and
    outputting the mixed-signal finite state machine model for use in simulation.

2. The method of claim 1, further allowing the user to set a profile, selected from linear and cubic, and a transition time for the state transition, thereby matching real behavior of the system.

3. The method of claim 2, wherein the cubic profile provides continuity in the first derivative for the analog variable during the state transition.

4. The method of claim 2, wherein the state vector ensures continuity of the analog variable when a new transition occurs before the transition time of a previous transition has elapsed.

5. The method of claim 4, wherein the mixed-signal finite state machine model goes through a continuum of intermediate states contained in a hypercube space where summed state vector components equal 1.

6. The method of claim 1, wherein only one state in the state diagram is required to carry an equation for the analog variable, this state being an initial state.

7. The method of claim 1, further allowing a user to define a plurality of analog variables through equations associated with different states in the state diagram, the plurality of analog variables being associated with a minimum set of state vectors.

8. The method of claim 7, wherein the minimum set of state vectors is obtained by having analog variables, defined through equations in the same states, share a common state vector.

9. The method of claim 1, further allowing the user to express the set of state equations in an implicit or explicit form.

10. The method of claim 1, further ensuring that the analog variable is not defined through equations associated with concurrent states.

* * * * *